US012809588B2

(12) United States Patent
Srinivasaraghavan et al.

(10) Patent No.: US 12,809,588 B2
(45) Date of Patent: Nov. 24, 2026

(54) SYSTEMS AND METHODS FOR DISCOVERY AND GENERALIZED EXPERIMENTATION WITH DIFFERENT TYPES OF SOFTWARE COMPONENTS

(71) Applicant: Verizon Patent and Licensing Inc., Basking Ridge, NJ (US)

(72) Inventors: Haripriya Srinivasaraghavan, Plano, TX (US); Raja Mahadevan, Irving, TX (US); Shoumik Chakravarty, Lantana, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 612 days.

(21) Appl. No.: 18/192,005

(22) Filed: Mar. 29, 2023

(65) Prior Publication Data

US 2024/0329939 A1 Oct. 3, 2024

(51) Int. Cl.
*G06F 8/10* (2018.01)
*G06F 11/3604* (2025.01)

(52) U.S. Cl.
CPC ............ *G06F 8/10* (2013.01); *G06F 11/3608* (2013.01)

(58) Field of Classification Search
CPC ............................... G06F 8/10; G06F 11/3608
USPC .......................................................... 717/126
See application file for complete search history.

(56) References Cited

U.S. PATENT DOCUMENTS 5,970,252 A * 10/1999 Buxton ................. G06F 9/4488 717/166
8,195,693 B2 * 6/2012 Syeda-Mahmood ... G06F 16/25 707/790
8,543,645 B1 * 9/2013 Lloyd ................. G06F 11/3006 709/200
10,733,078 B2 * 8/2020 Mordo ................ G06F 11/3692
11,119,897 B2 * 9/2021 Mordo ................ G06F 11/3692
11,195,202 B2 * 12/2021 Leonard ............. G06Q 30/0243
(Continued)

FOREIGN PATENT DOCUMENTS

WO WO-2015095411 A1 * 6/2015 ............. H04L 67/10

OTHER PUBLICATIONS

Deng, Yinlin, et al. "Fuzzing deep-learning libraries via automated relational api inference." Proceedings of the 30th ACM Joint European Software Engineering Conference and Symposium on the Foundations of Software Engineering. 2022. (Year: 2022).*

*Primary Examiner* — Matthew J Brophy

(57) ABSTRACT

A device may store, in a data structure, a plurality of feature variants associated with a schema of software and signatures generated based on the schema, and may provide a user interface that requests experiment information. The device may receive, via the user interface, the experiment information, and may identify, in the data structure, a set of feature variants, from the plurality of feature variants, based on the experiment information. The device may identify a set of corresponding signatures for the set of feature variants and may compare signatures of the set of corresponding signatures to identify compliant signatures of the set of corresponding signatures. The device may generate compliant feature variants based on the compliant signatures and may define segments and metrics. The device may generate the software experiment based on the compliant feature variants, the segments, and the metrics, and may execute the software experiment to generate results.

20 Claims, 11 Drawing Sheets

(56) References Cited

U.S. PATENT DOCUMENTS 11,468,348 B1 * 10/2022 Cui ........................ G06F 11/302
11,816,112 B1 * 11/2023 Nychis .............. G06F 16/24578
11,886,434 B1 * 1/2024 Magnuson ............ G06F 16/172
12,038,827 B2 * 7/2024 Mordo ................ G06F 11/3692
12,056,772 B2 * 8/2024 King ...................... G06Q 40/08
12,326,803 B2 * 6/2025 van Adelsberg .... G06F 11/3696
12,554,487 B2 * 2/2026 Sagal ........................ G06F 8/71
12,608,357 B2 * 4/2026 Ben-Aharon ....... G06F 16/2246
2006/0136428 A1 * 6/2006 Syeda-Mahmood ... G06F 16/25
2014/0047433 A1 * 2/2014 Gaither ............... G06F 9/44526 709/224
2015/0039515 A1 * 2/2015 Gaither ............... G06F 9/44526 717/174
2015/0172146 A1 * 6/2015 Mahaffey ............ G06F 11/3604 709/224
2016/0098270 A1 * 4/2016 Hanusiak ............ G06F 11/3698 717/101
2016/0124839 A1 * 5/2016 Mordo ................ G06F 11/3692 717/124
2017/0090891 A1 * 3/2017 Guerre ...................... G06F 8/71
2018/0089716 A1 * 3/2018 Xu ..................... G06Q 30/0243
2019/0346297 A1 * 11/2019 Lekivetz ............... G06F 11/079
2020/0104383 A1 * 4/2020 Ivaniuk ............... G06F 11/3688
2020/0126112 A1 * 4/2020 Leonard .................... G06F 8/61
2020/0319996 A1 * 10/2020 Mordo ................ G06F 11/3692
2021/0390011 A1 * 12/2021 Cser ...................... G06F 11/079
2021/0397541 A1 * 12/2021 Mordo ................ G06F 11/3692
2022/0043742 A1 * 2/2022 van Adelsberg .... G06F 11/3698
2022/0129765 A1 * 4/2022 Lindon ................... G06F 11/30
2022/0358598 A1 * 11/2022 King ................ G06Q 10/06393
2022/0374935 A1 * 11/2022 Kulkarni ............ G06Q 30/0243
2023/0273874 A1 * 8/2023 Shao ................... G06F 11/3688 714/38.1
2024/0086183 A1 * 3/2024 Avila ......................... G06F 8/71
2024/0086495 A1 * 3/2024 Gandhi ............... G06F 11/3692
2024/0103998 A1 * 3/2024 Bae ..................... G06F 11/3438
2024/0160615 A1 * 5/2024 Ben-Aharon ....... G06F 16/2246
2024/0211250 A1 * 6/2024 Pan ........................... G06F 8/71
2024/0311281 A1 * 9/2024 Wu ..................... G06F 11/3688
2024/0329939 A1 * 10/2024 Srinivasaraghavan ...................... G06F 11/3608
2026/0003773 A1 * 1/2026 Mordo ................ G06F 11/3698

* cited by examiner

SYSTEMS AND METHODS FOR DISCOVERY AND GENERALIZED EXPERIMENTATION WITH DIFFERENT TYPES OF SOFTWARE COMPONENTS

BACKGROUND

Software experimentation is required in order to improve the agility of software development and delivery to users, as well as to ensure that a correct set of software features are delivered to the users.

DETAILED DESCRIPTION OF EXAMPLE EMBODIMENTS

Figure 1A:
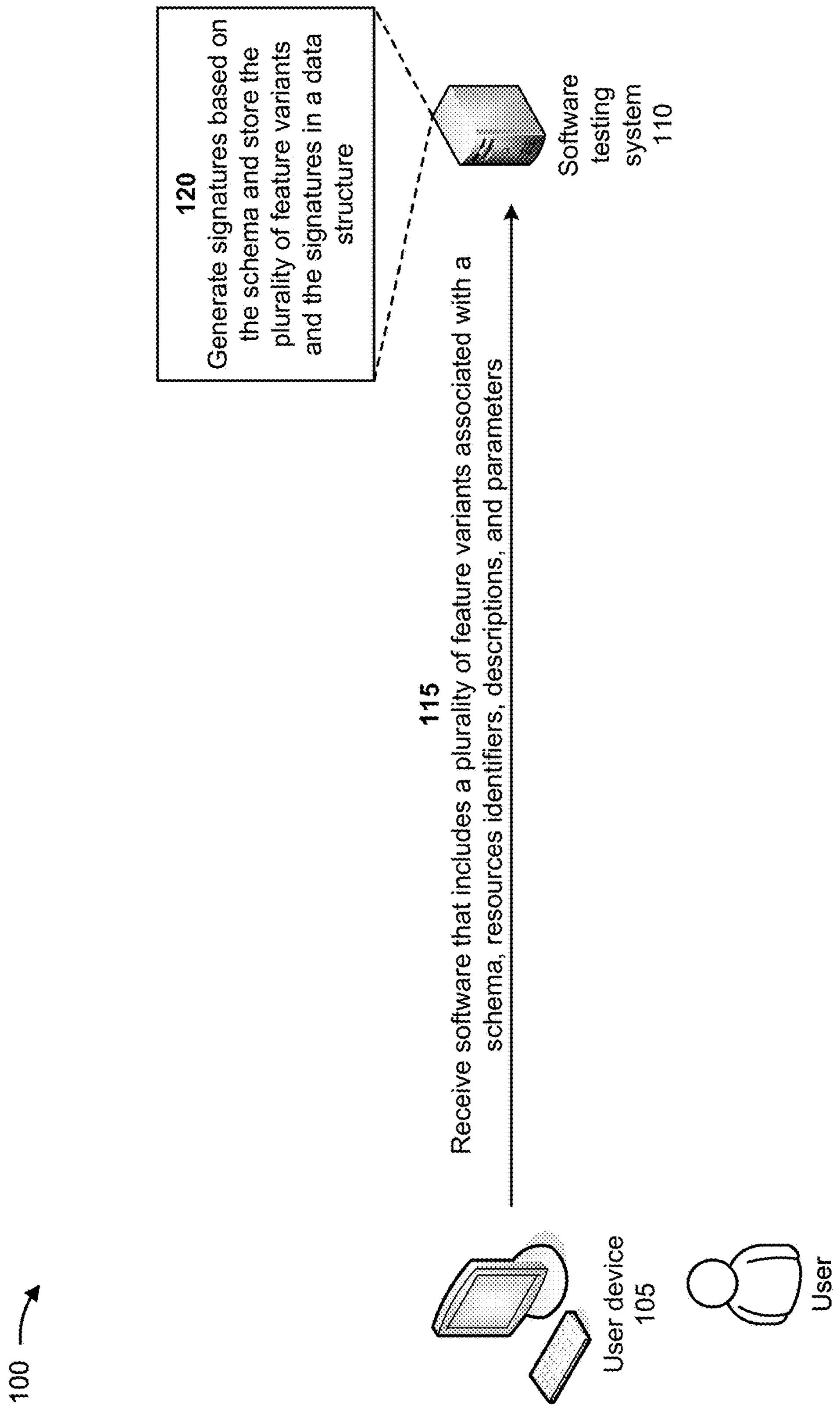
FIGS. 1A-1H are diagrams of an example associated with discovery and generalized experimentation with different types of software components.

The following detailed description of example implementations refers to the accompanying drawings. The same reference numbers in different drawings may identify the same or similar elements.

Software has traditionally been monolithic, but has moved into microservices-based and component-based architectures over the years. Some software features may be available purely through user interfaces, through application programming interfaces (APIs), through organization and presentation of content, using specific machine learning models, and/or the like. Current software experimentation systems, on the other hand, still operate at a particular level of a software feature. For example, there are software experimentation systems that only simplify web application-based experiments, that only support software experiments for mobile devices, that only support software experiments for APIs, that only support software experiments for machine learning models, and/or the like. There is no unifying, extensible way to register and discover software elements (e.g., modular features, modular metrics, and/or the like) and to compose the software elements together to setup a software experiment.

Thus, current systems for software experimentation consume computing resources (e.g., processing resources, memory resources, communication resources, and/or the like), networking resources, and/or other resources associated with failing to perform software experiments on different types of software elements (e.g., components), failing to perform software experiments on a variety of software (e.g., user interfaces, APIs, content organization, content presentation, machine learning models, and/or the like), generating erroneous results with software that was not subject to software experiments before being implemented, attempting to discover and correct the erroneous results generated by the software, and/or the like. In yet other instances, experimental features across different types of software implementations (e.g., user interfaces (UIs), application programming interfaces (APIs), and/or the like) are not adequately tested with a small number of users to ensure the software is not adversely affecting usability, engagement, or product revenue before enabling the software for all users. Even in cases when software experimentation systems exist for one type of software element (e.g., web, UI, and/or the like), it is not easy for experiments to be set up and monitored in a similar manner across different types of software elements.

Some implementations described herein provide a software experimentation or testing system for discovery and generalized experimentation with different types of software components. For example, the software testing system may receive software that includes a plurality of feature variants associated with a schema, and may store, in a data structure, the plurality of feature variants and signatures generated based on the schema. The software testing system may provide a user interface that requests experiment information associated with generating a software experiment, and may receive, via the user interface, the experiment information associated with generating the software experiment. The software testing system may identify, in the data structure, a set of feature variants, from the plurality of feature variants, based on the experiment information, and may identify a set of corresponding signatures for the set of feature variants. The software testing system may compare signatures of the set of corresponding signatures to identify compliant signatures of the set of corresponding signatures, and may generate compliant feature variants based on the compliant signatures. The software testing system may define segments and metrics for the software experiment based on the compliant feature variants, and may generate the software experiment based on the compliant feature variants, the segments, and the metrics. The software testing system may execute the software experiment to generate results and may perform one or more actions based on the results.

In this way, the software testing system provides discovery and generalized experimentation with different types of software components. For example, the software testing system may define each software element (e.g., a software feature variant, a metric, and/or the like), that can participate in a software experiment, to be individually and uniquely addressable (e.g., using a resource identifier) and executable (e.g., using deployable containers). The software testing system may classify each software element and may generate a signature for each software element. The software testing system may enable each software element to be discoverable and includable into a software experiment, and may utilize software elements that are compatible in a software experiment together (e.g., as a pipeline of software elements that are combined into a software experiment). The software testing system may execute the software experiment to generate results, and may perform one or more actions (e.g., modify software elements) based on the results.

Thus, the software testing system may conserve computing resources, networking resources, and/or other resources that would have otherwise been consumed by failing to perform software experiments on different types of software elements (e.g., components), failing to perform software experiments on a variety of software (e.g., user interfaces, APIs, content organization, content presentation, machine learning models, and/or the like), generating erroneous results with software that was not subject to software experiments before being implemented, attempting to discover and correct the erroneous results generated by the software, and/or the like.

FIGS. 1A-1H are diagrams of an example 100 associated with discovery and generalized experimentation with different types of software components. As shown in FIGS. 1A-1H, example 100 includes a user device 105 associated with a user (e.g., software developer, a software experimenter, and/or the like) and a software testing system 110. Further details of the user device 105 and the software testing system 110 are provided elsewhere herein.

As shown in FIG. 1A, and by reference number 115, the software testing system 110 may receive software that includes a plurality of feature variants associated with a schema, resources identifiers, descriptions, and parameters. For example, software developers may develop software that includes the plurality of feature variants associated with the schema, and may utilize user devices 105 to provide the software that includes the plurality of feature variants associated with the schema, the resources identifiers, the descriptions, and the parameters to the software testing system 110. The software testing system 110 may receive software that includes the plurality of feature variants from the user devices 105. In some implementations, the software testing system 110 may continuously receive the plurality of feature variants from the user devices 105, periodically receive the plurality of feature variants from the user devices 105, may receive the plurality of feature variants from the user devices 105 based on providing requests to the user devices 105, and/or the like. In some implementations, the software testing system 110 may provide, to the user devices 105, user interfaces that enable the software developers to provide the plurality of feature variants to the software testing system 110.

In some implementations, the plurality of feature variants may be utilized to generate a software experiment, such as an A/B testing software experiment, a multiarmed bandit software experiment, and/or the like. The plurality of feature variants may include software components, APIs, software models (e.g., machine learning models), user interface (UI) elements, feature definitions, software code, sample data, deployment containers, descriptions, resource identifiers (e.g., uniform resource identifiers (URIs), uniform resource names (URNs), and uniform resource locators (URLs)), addresses (e.g., identifying feature variant schemes, feature variant endpoints, feature variant versions, and feature variant parameters), and/or the like. For example, for a model, the feature variant may identify a scheme (e.g., "model"), an endpoint of the feature variant (e.g., "video/personalize/moviepurchase/:modelId"), a feature variant version (e.g., "version 1"), a model URI (e.g., "model://<baseUrl>/video/personalize/moviepurchase/:modelId/v1"), and a calling for the model (e.g., "model://<baseUrl>/video/personalize/moviepurchase/:modelId/v1").

An example of software components of a feature variant may include a feature variant comparing URI A and URI B. URI A (e.g., rail://<baseurl>/page/:pageId/component/:compId1/) may be associated a schema (e.g., type: rail; data model: metadata; functionality: component contents; inputs: pageId and componentId; and outputs: List[contentmetadata]). URI B may be rail://<baseurl>/page/:pageId/component/:compId2/.

An example of models of a feature variant may include a feature variant comparing model A and model B. Model A (e.g., model://<baseurl>/video/morelikethis/:id) may be associated with variant parameters or a query (e.g., {"movies"=true, "shows"=true}) and a schema (e.g., type: model; data model: video; functionality: morelikethis; inputs: contented; and outputs: List[contentid]). Model B (e.g., model://<baseurl>/video/morelikethis/:id) may be associated with variant parameters or a query (e.g., {"movies"=true, "shows"=false}) and a schema (e.g., type: model; data model: video; functionality: morelikethis; inputs: contented; and outputs: List[contentid]).

An example of APIs of a feature variant may include a feature variant comparing API A and API B. API A (e.g., api://<baseurl>/video/programinfopage/:id) may include a schema (e.g., type: model; data model: video; functionality: videoinfo; inputs: contentid; and outputs: contentmetadata). API B (e.g., api://<baseurl>/video/watchinfo/:id) may include a schema (e.g., type: model; data model: video; functionality: videoinfo; inputs: contented; and outputs: contentmetadata).

An example of UI elements of a feature variant may include a feature variant comparing widget A and widget B. Widget A (e.g., uiwidget://<baseurl1>/page/:pageId/searchtext/:videosearchterm) may include a schema (e.g., type: uiwidget; data model: movietitle; functionality: video text search; inputs: pageid and string; and outputs: List[contentmetadata]) Widget B (e.g., uiwidget://<baseurl2>/searchquery/:videosearchtext) may include a schema (e.g., type: uiwidget; data model: movietitle; functionality: video text search; inputs: pageid and string; and outputs: List[contentmetadata]).

As further shown in FIG. 1A, and by reference number 120, the software testing system 110 may generate signatures based on the schema and may store the plurality of feature variants and the signatures in a data structure (e.g., a database, a table, a list, a repository, a registry, and/or the like). For example, the software testing system 110 may generate a signature for each item stored in the data structure based on the schema (e.g., type, data mode, functionality, inputs, outputs, measurement criteria, and/or the like). The software testing system 110 may store the plurality of feature variants (e.g., the schema, the resources identifiers, the descriptions, and the parameters associated with the plurality of feature variants) and corresponding signatures of the plurality of feature variants in the data structure. In some implementations, the software testing system 110 may continuously store the plurality of feature variants and the corresponding signatures in the data structure, may periodically store the plurality of feature variants and the corresponding signatures in the data structure, may store the plurality of feature variants and the corresponding signatures in the data structure when the software is received from the user device(s) 105, and/or the like.

Figure 1B:
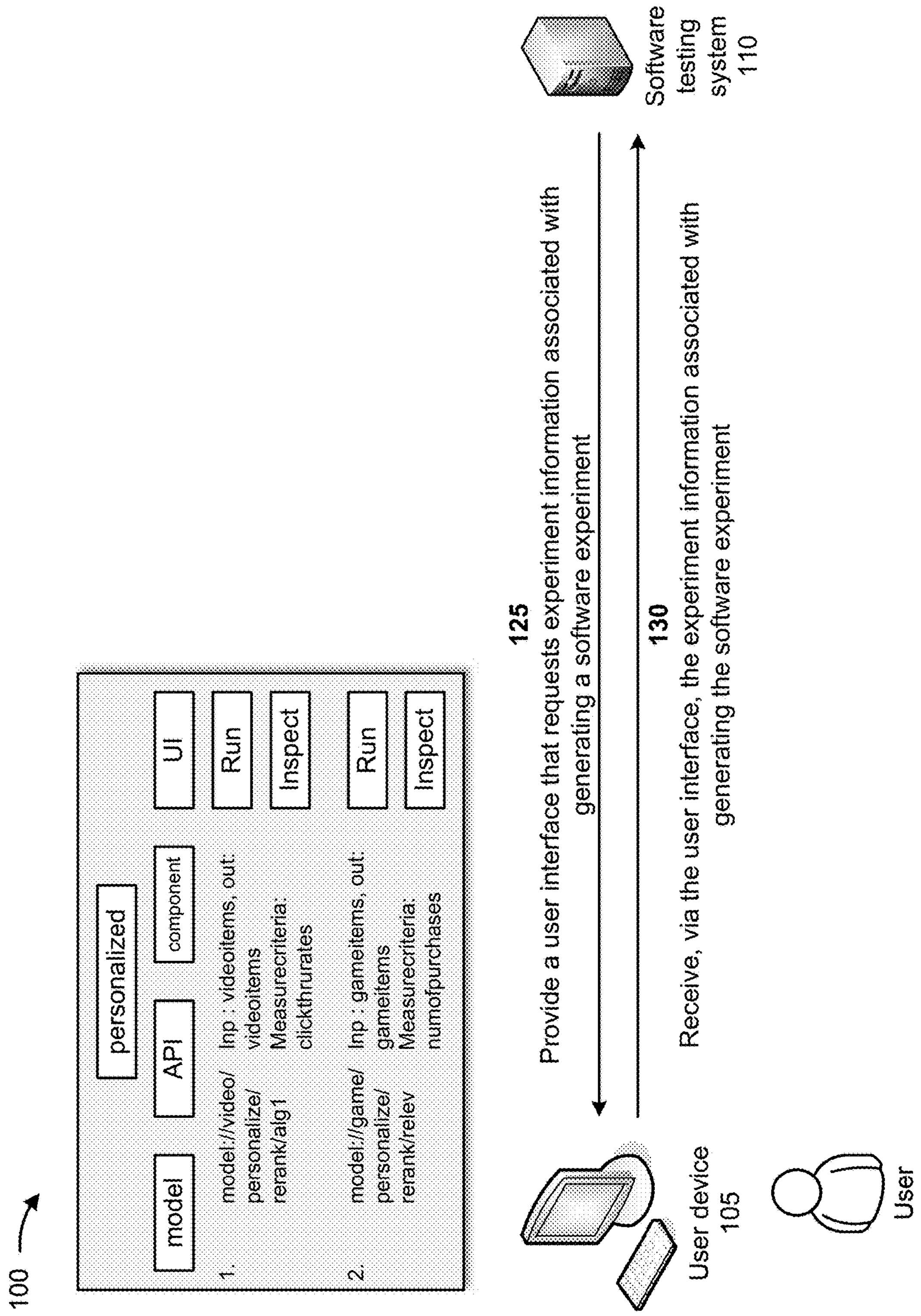

As shown in FIG. 1B, and by reference number 125, the software testing system 110 may provide a user interface that requests experiment information associated with generating a software experiment. For example, the software testing system 110 may generate a user interface that includes fields for inputting the experiment information associated with generating the software experiment. In some implementations, the user interface may include fields requesting characteristics of the software experiment, such as a type of software experiment (e.g., a personalized experiment), a data model associated with the software experiment, an API associated with the software experiment, a software component associated with the software experiment, a UI element associated with the software experiment, functionality associated with the software experiment, inputs of the software experiment, outputs of the software experiment, measurement criteria of the software experiment, and/or the like. In some implementations, the software testing system 110 may provide the user interface to the user device 105, and the user device 105 may display the user interface to the user (e.g., a software experiment manager).

In some implementations, the user interface may enable software experiment managers to search through the data structure for existing experimentation types, feature variants, existing metrics, and/or the like. The user interface may enable software experiment managers to select potential candidates (e.g., feature variants, metrics, and/or the like) to compare in a software experiment, and to view the components and/or artifacts corresponding to each feature variant, such as documentation, software code, sample data, and/or the like, that can be used to execute the feature variant or to combine the feature variant with other feature variants. The user interface may enable software experiment managers to pipeline, join, or split multiple elements (e.g., feature variants) to create a set of compatible elements to be included in the software experiment. Thus, the user interface may enable software experiment managers to setup software experiments.

In some implementations, the inputs, the outputs, and the schemas in the data structure may be composable. Thus, software experiment managers may utilize the user interface to edit a schema element, and the software testing system 110 may provide, via the user interface, other schemas that are available for selection (e.g., related to the edited schema element). The user interface may enable software experiment managers to select individual elements for schemas or to create a feature variant using one of the individual elements. For example, if content metadata is available as a data model, a software experiment manager may utilize the user interface to create a subclass of movie metadata or show metadata by using the content metadata as a base class and adding new fields to the content metadata. Similarly, the user interface may enable the software experiment manager to create data relationships between the data model, inputs, outputs, type, measurement criteria, and other elements in a schema.

In some implementations, the user interface may provide assisted descriptions. For example, if a software experiment manager inputs "more" to the user interface, the software testing system 110 may identify several matches, such as "more like this," "more results," and/or the like. The software experiment manager may utilize this feature when creating a new feature variant that is similar to one or more existing feature variants.

In some implementations, the user interface may enable software experiment managers to test run (e.g., execute) a feature variant (e.g., an API, a UI element, a software component, and/or a model) on a trial basis, to test run a metric to see what the metric contains, and/or the like. The user interface may enable software experiment managers to inspect a feature variant, such as see sample documentation, test data, source code, and/or the like associated with the feature variant. For each feature variant, a sample input, sample invocation, sample data, and/or the like may be made available by the software testing system 110 so that software experiment managers may observe effects and/or results of executing each of these elements. In this way, the software testing system 110 may enable software experiment managers to create other elements with similar signatures and to experiment with the other elements.

As further shown in FIG. 1B, and by reference number 130, the software testing system 110 may receive, via the user interface, the experiment information associated with generating the software experiment. For example, the user device 105 may receive the experiment information associated with generating the software experiment from the user, via the user interface. The user device 105 may provide the experiment information associated with generating the software experiment to the software testing system 110, and the software testing system 110 may receive the experiment information associated with generating the software experiment from the user device 105. In some implementations, the experiment information may include characteristics of the software experiment, such as a type of software experiment, a data model associated with the software experiment, an API associated with the software experiment, a software component associated with the software experiment, a UI element associated with the software experiment, functionality associated with the software experiment, inputs of the software experiment, outputs of the software experiment, measurement criteria of the software experiment, and/or the like.

Figure 1C:
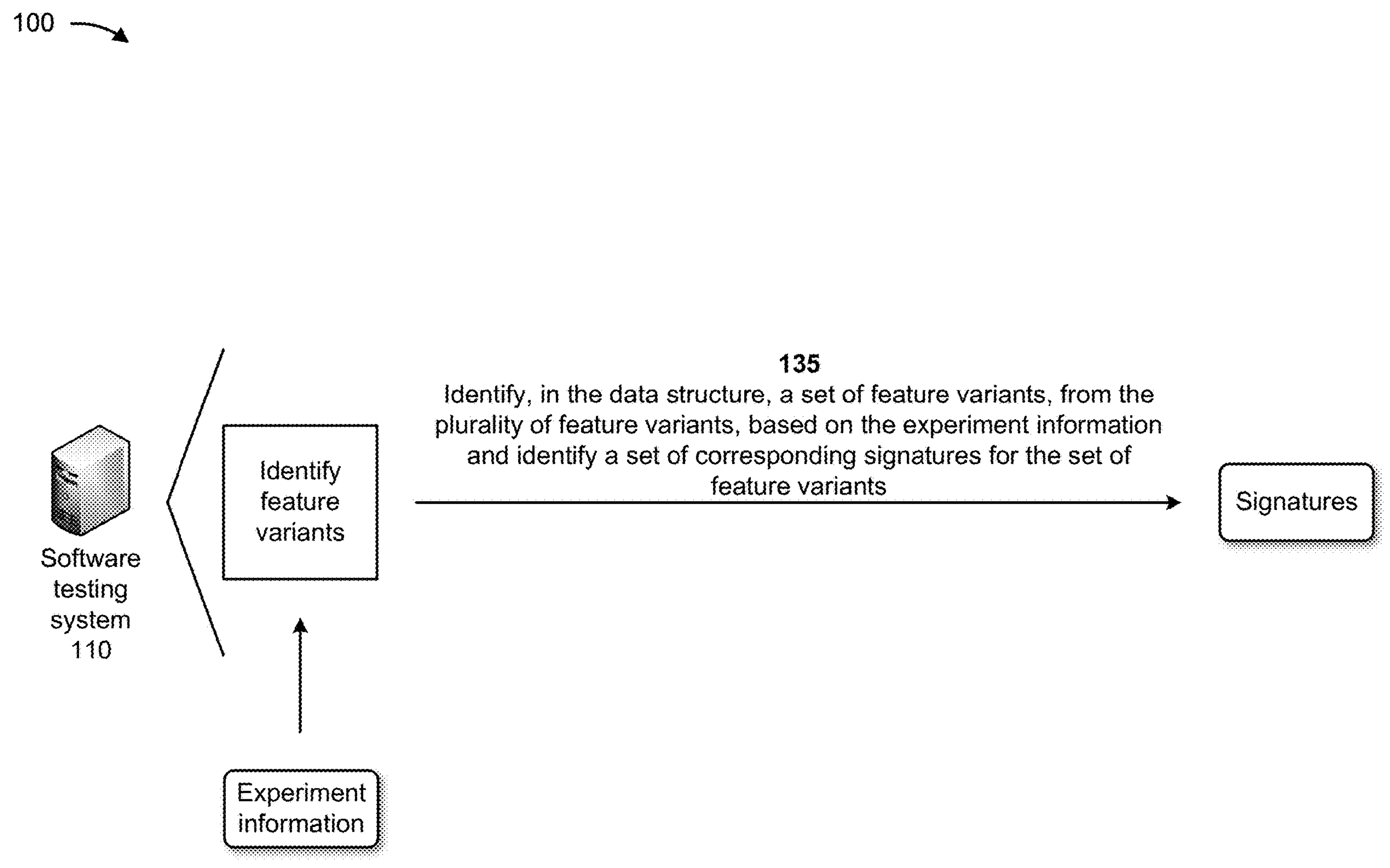

As shown in FIG. 1C, and by reference number 135, the software testing system 110 may identify, in the data structure, a set of feature variants, from the plurality of feature variants, based on the experiment information and may identify a set of corresponding signatures for the set of feature variants. For example, the software testing system 110 may perform a query of the plurality of feature variants in the data structure, based on the experiment information, and may return the set of feature variants, from the plurality of feature variants, based on the query. In some implementations, the set of feature variants may include feature variants that match a data model identified in the experiment information, an API identified in the experiment information, a software component identified in the experiment information, a UI element identified in the experiment information, functionality identified in the experiment information, inputs identified in the experiment information, outputs identified in the experiment information, measurement criteria identified in the experiment information, and/or the like.

After identifying the set of feature variants, the software testing system 110 may identify signatures that correspond to the feature variants included in the set of feature variants (e.g., since each feature variant in the data structure is associated with a corresponding signature, as described above). The identified signatures may form the set of corresponding signatures for the set of feature variants.

Figure 1D:
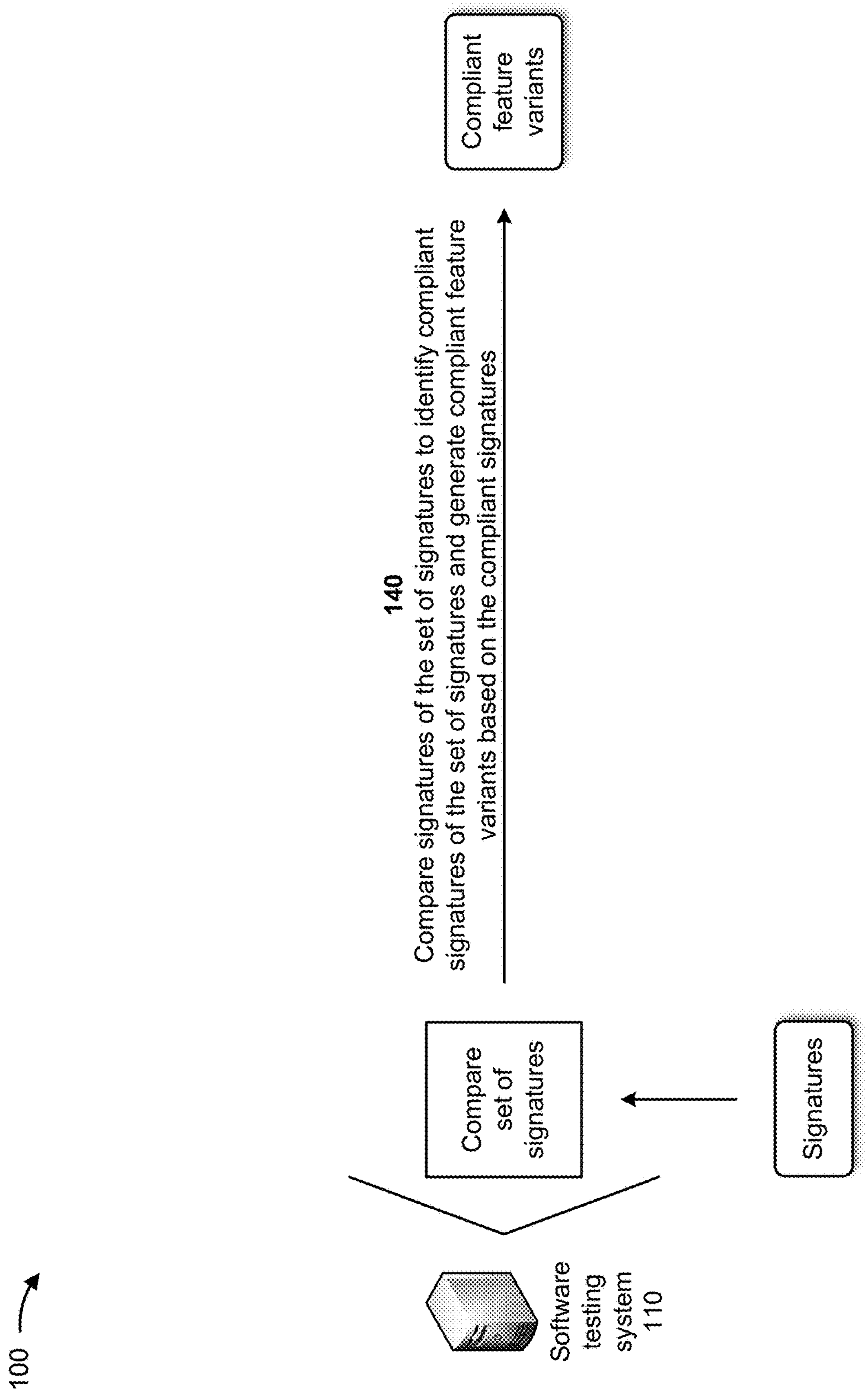

As shown in FIG. 1D, and by reference number 140, the software testing system 110 may compare signatures of the set of signatures to identify compliant signatures of the set of signatures and may generate compliant feature variants based on the compliant signatures. For example, the software testing system 110 may include a model that matches compliant feature variants included in the set of feature variants. In some implementations, the software testing system 110 may utilize the model to compare the signatures of the set of signatures to identify the compliant signatures of the set of signatures. After identifying the compliant signatures, the software testing system 110 may identify the compliant feature variants that correspond to the compliant signatures (e.g., since each feature variant in the data structure is associated with a corresponding signature, as described above).

In some implementations, the model may compare signatures by individual elements using a first operation (e.g., A:>=B), where the operator ":>=" indicates that feature variant A performs the same functionality as feature variant B or performs a super-set of functionality of feature variant B, and transformation may result in feature variants A and B performing the same functionality. The model may compare signatures by individual elements using a second operation (e.g., A:=B), where feature variant A can be replaced by feature variant B and hence feature variants A and B may be part of the same software experiment, and the operator ":=" indicates that feature variant A performs the same functionality as feature variant B, with the same signatures. The model may compare signatures by individual elements using a third operation (e.g., A:>B or B:>A, then A|C:=B), where a transformation of feature variant C may be pipelined with feature variant A or feature variant B, so that resulting pipelines are exactly the same in terms of signature and hence can be used in a software experiment. For example, the model may analyze API A (e.g., input: video id; output: video metadata; and functionality: similarity), API B (e.g., input: video id; output: video id; and functionality: similarity), and API C (e.g., input video id; output: video metadata; and functionality: metadata lookup). The model may determine that calling API B is called and pipelining results of API B to API C may be equivalent to calling API A with the original video id. Therefore, the model may determine that API B and API C are compatible with API A and may be used as feature variants in a software experiment. In some implementations, the model may prevent reimplementing existing APIs, data models, software components, or UI elements in many situations, and may be utilized to create a pipeline of complex feature variants from simple feature variants.

Figure 1E:
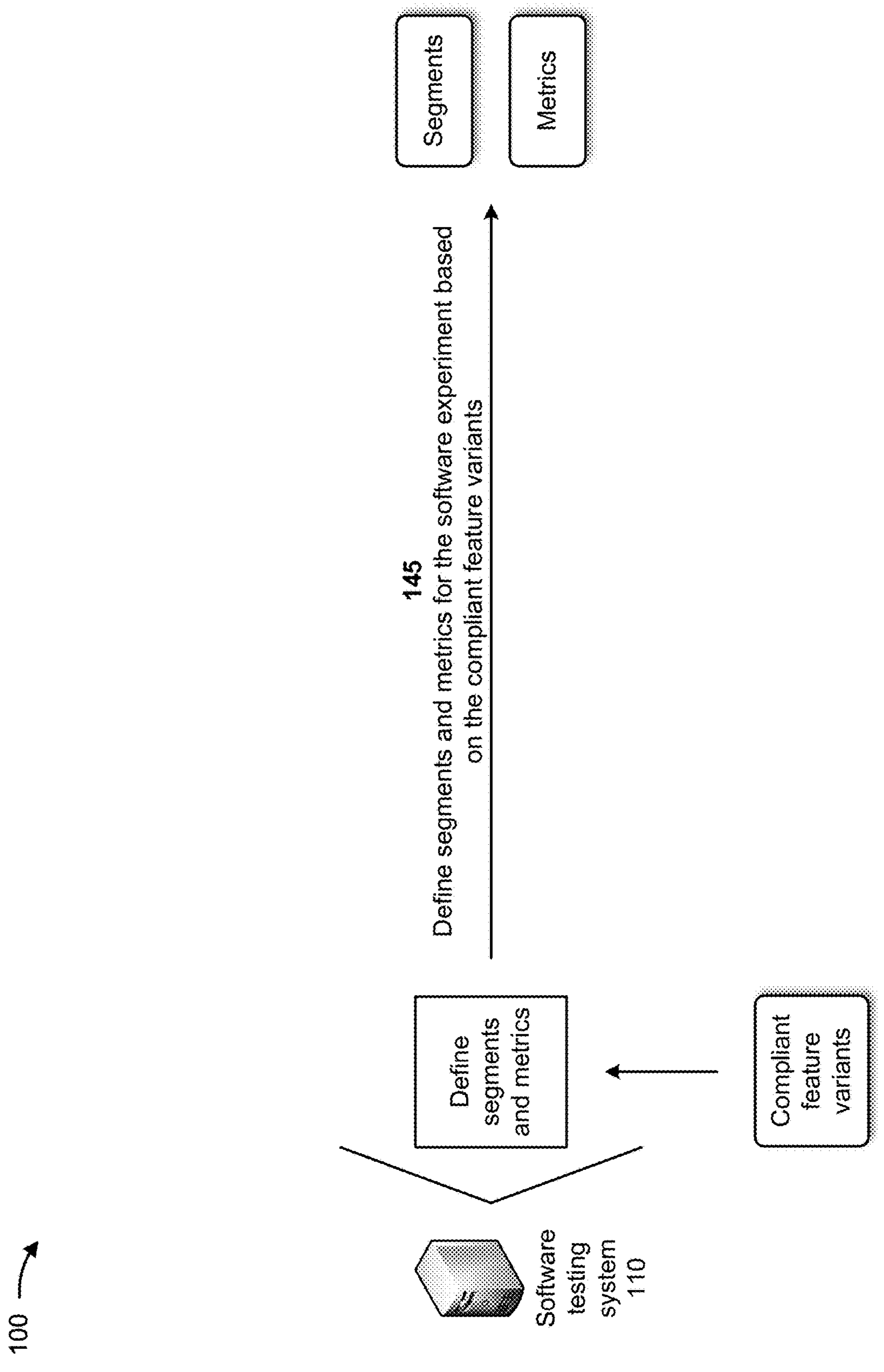

As shown in FIG. 1E, and by reference number 145, the software testing system 110 may define segments and metrics for the software experiment based on the compliant feature variants. For example, in order to compare two or more compliant feature variants for a software experiment, the compliant feature variants may share a common population of users, which can be segmented into user segments for different compliant feature variants. The user population may include a set of users, user devices, user accounts, and/or the like that may be split into multiple user segments (e.g., where each user segment may utilize a different feature variant for the software experiment). In some implementations, the software testing system 110 may define the segments for the software experiment based on the compliant feature variants.

The software testing system may determine a common set of metrics (e.g., business metrics, technical metrics, and/or the like) using each of the compliant feature variants. The software testing system 110 may evaluate the metrics in a manner similar to the schema of the feature variants for compatibility. For example, either the metrics are exactly the same, or a feature variant generates a subset of metrics that are generated by another feature variant (e.g., thus, the two feature variants may be measured using the subset of the metrics). In one example, feature variant A may generate an amount of money spent by each user for a time period. Feature variant B may generate the amount of money spent by each user for the time period, as well as a number of content items watched during the time period. To measure this software experiment, the software testing system 110 may utilize an intersection of the two metrics (i.e., the amount spent by each user for the time period). In some implementations, the software testing system 110 may define the metrics for the software experiment based on the compliant feature variants. In some implementations, the segments and the metrics may be session based.

Figure 1F:
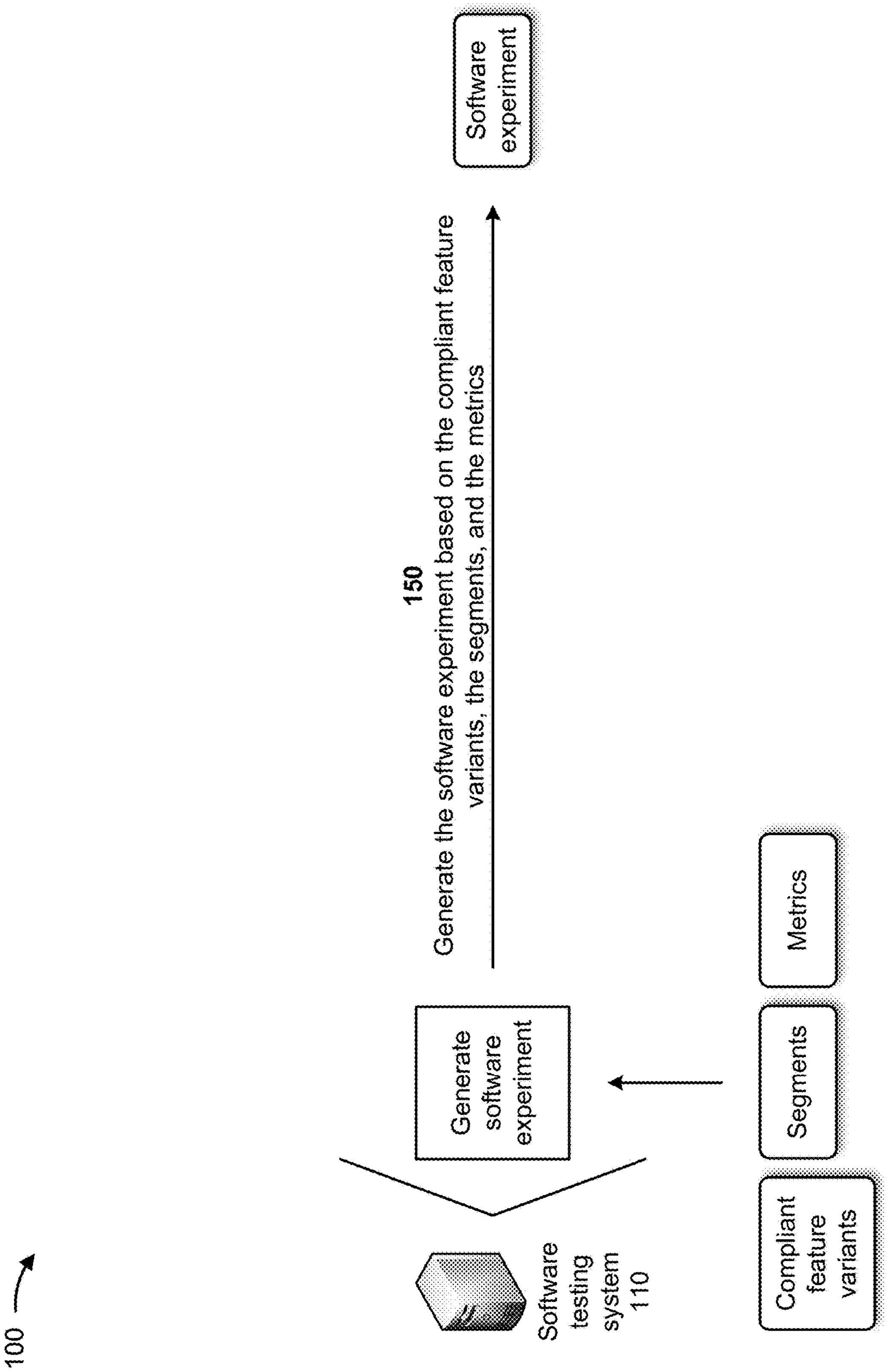

As shown in FIG. 1F, and by reference number 150, the software testing system 110 may generate the software experiment based on the compliant feature variants, the segments, and the metrics. For example, the software testing system 110 may combine the compliant feature variants, the segments, and the metrics into the software experiment. In some implementations, the software testing system 110 may generate the software experiment based on pipelining, joining, splitting, and/or the like the compliant feature variants, the segments, and the metrics. In some implementations, the software testing system 110 may provide the software experiment to the user device 105 and the user device 105 may display the software experiment to the user. The user may review, modify, delete, execute, and/or the like the software experiment. If the user modifies the software experiment, the user device 105 may provide the modified software experiment to the software testing system 110 for execution.

Figure 1G:
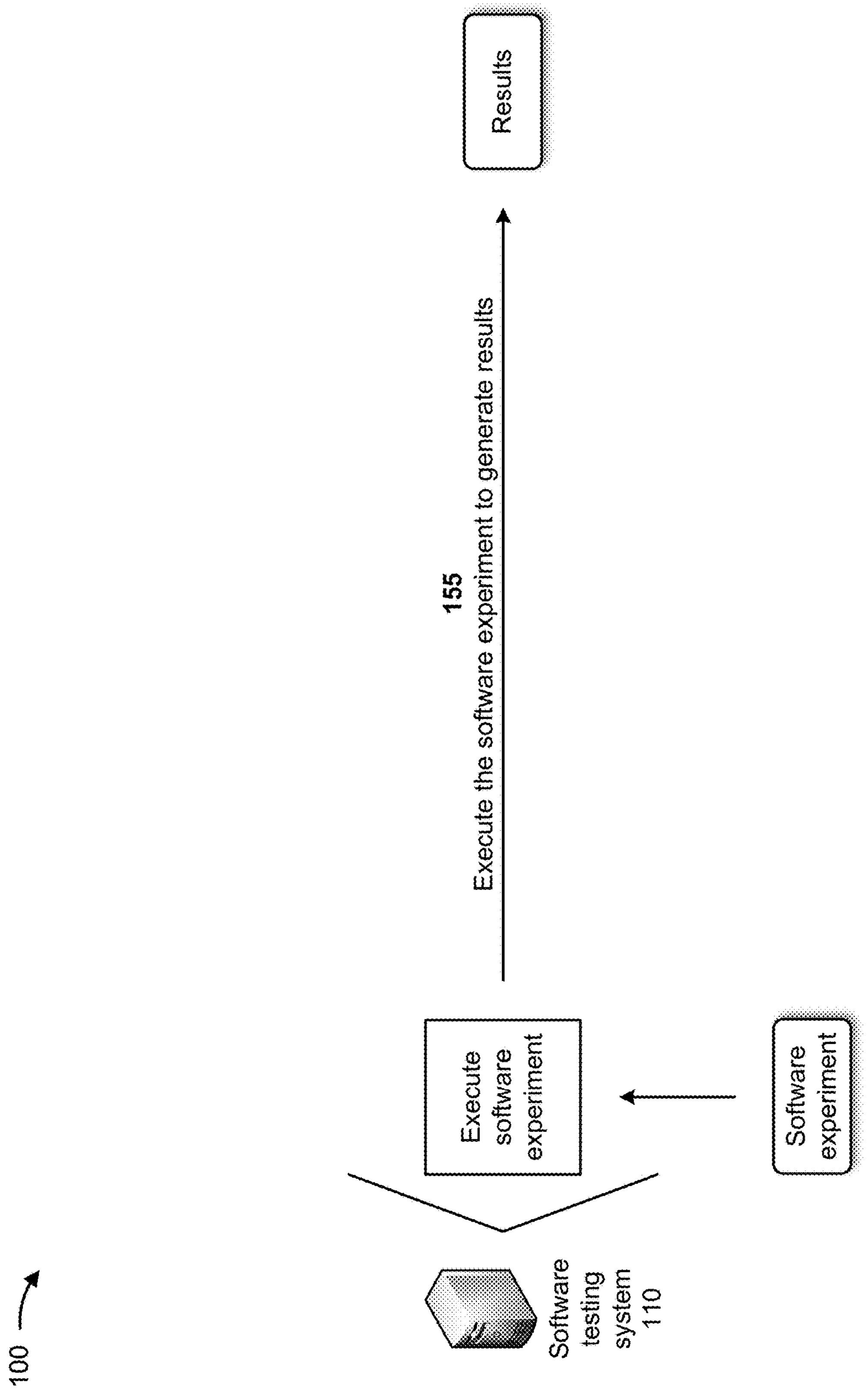

As shown in FIG. 1G, and by reference number 155, the software testing system 110 may execute the software experiment to generate results. For example, the software testing system 110 may execute the software experiment. Execution of the software experiment may generate results, such as, for example, whether first product appeals more to a user segment than a second product, whether a first service will generate more revenue than a second service, and/or the like. In some implementations, the software testing system 110 may provide the software experiment to the user device 105, and the user device 105 may execute the software experiment to generate the results. In such implementations, the user device 105 may provide the results to the software testing system 110 for analysis.

Figure 1H:
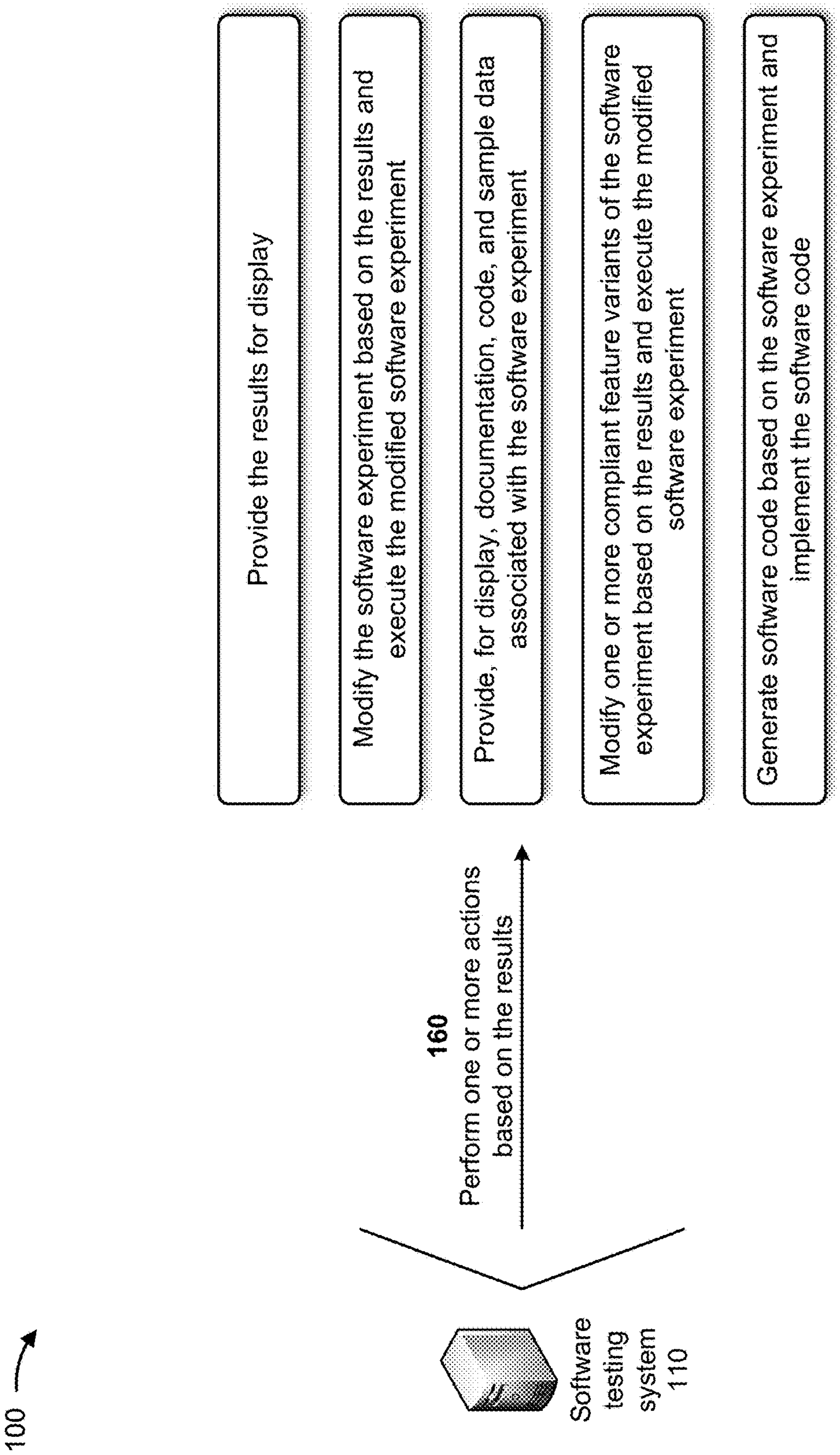

As shown in FIG. 1H, and by reference number 160, the software testing system 110 may perform one or more actions based on the results. In some implementations, performing the one or more actions includes the software testing system 110 providing the results for display. For example, the software testing system 110 may provide the results to the user device 105 and the user device 105 may display the results to the user. The user may utilize the results to determine whether the software experiment is successful. In this way, the software testing system 110 conserves computing resources, networking resources, and/or other resources that would have otherwise been consumed by failing to perform software experiments on different types of software elements.

In some implementations, performing the one or more actions includes the software testing system 110 modifying the software experiment based on the results and executing the modified software experiment. For example, the software testing system 110 may determine that the results are unsuccessful, and may modify the software experiment based on the results and to generate a modified software experiment. The software testing system 110 may execute the modified software experiment to generate additional results (e.g., successful results). In this way, the software testing system 110 conserves computing resources, networking resources, and/or other resources that would have otherwise been consumed by attempting to discover and correct the erroneous results generated by the software.

In some implementations, performing the one or more actions includes the software testing system 110 providing, for display, documentation, code, and sample data associated with the software experiment. For example, the software testing system 110 may provide documentation, code, and sample data associated with the software experiment to the user device 105, and the user device 105 may display the documentation, the code, and the sample data associated with the software experiment to the user. This may enable the user to determine whether the software experiment is successful. In this way, the software testing system 110 conserves computing resources, networking resources, and/ or other resources that would have otherwise been consumed by failing to perform software experiments on a variety of software.

In some implementations, performing the one or more actions includes the software testing system 110 modifying one or more compliant feature variants of the software experiment based on the results and executing the modified software experiment. For example, the software testing system 110 may determine that the results are unsuccessful, and may modify one or more compliant feature variants of the software experiment based on the results and to generate a modified software experiment. The software testing system 110 may execute the modified software experiment to generate additional results (e.g., successful results). In this way, the software testing system 110 conserves computing resources, networking resources, and/or other resources that would have otherwise been consumed by attempting to discover and correct the erroneous results generated by the software.

In some implementations, performing the one or more actions includes the software testing system 110 generating software code based on the software experiment and implementing the software code. For example, the software testing system 110 may determine that software experiment is successful, and may generate software code based on the software experiment and on determining that the software experiment is successful. The software testing system 110 may implement the software code. In this way, the software testing system 110 conserves computing resources, networking resources, and/or other resources that would have otherwise been consumed by generating erroneous results with software that was not subject to software experiments before being implemented, attempting to discover and correct the erroneous results generated by the software, and/or the like.

In this way, the software testing system 110 provides discovery and generalized experimentation with different types of software components. For example, the software testing system 110 may define each software element, that can participate in a software experiment, to be individually and uniquely addressable and executable. The software testing system 110 may classify each software element and may generate a signature for each software element. The software testing system 110 may enable each software element to be discoverable and includable into a software experiment, and may utilize software elements that are compatible in a software experiment together. The software testing system 110 may execute the software experiment to generate results, and may perform one or more actions based on the results. Thus, the software testing system 110 may conserve computing resources, networking resources, and/or other resources that would have otherwise been consumed by failing to perform software experiments on different types of software elements, failing to perform software experiments on a variety of software, generating erroneous results with software that was not subject to software experiments before being implemented, attempting to discover and correct the erroneous results generated by the software, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
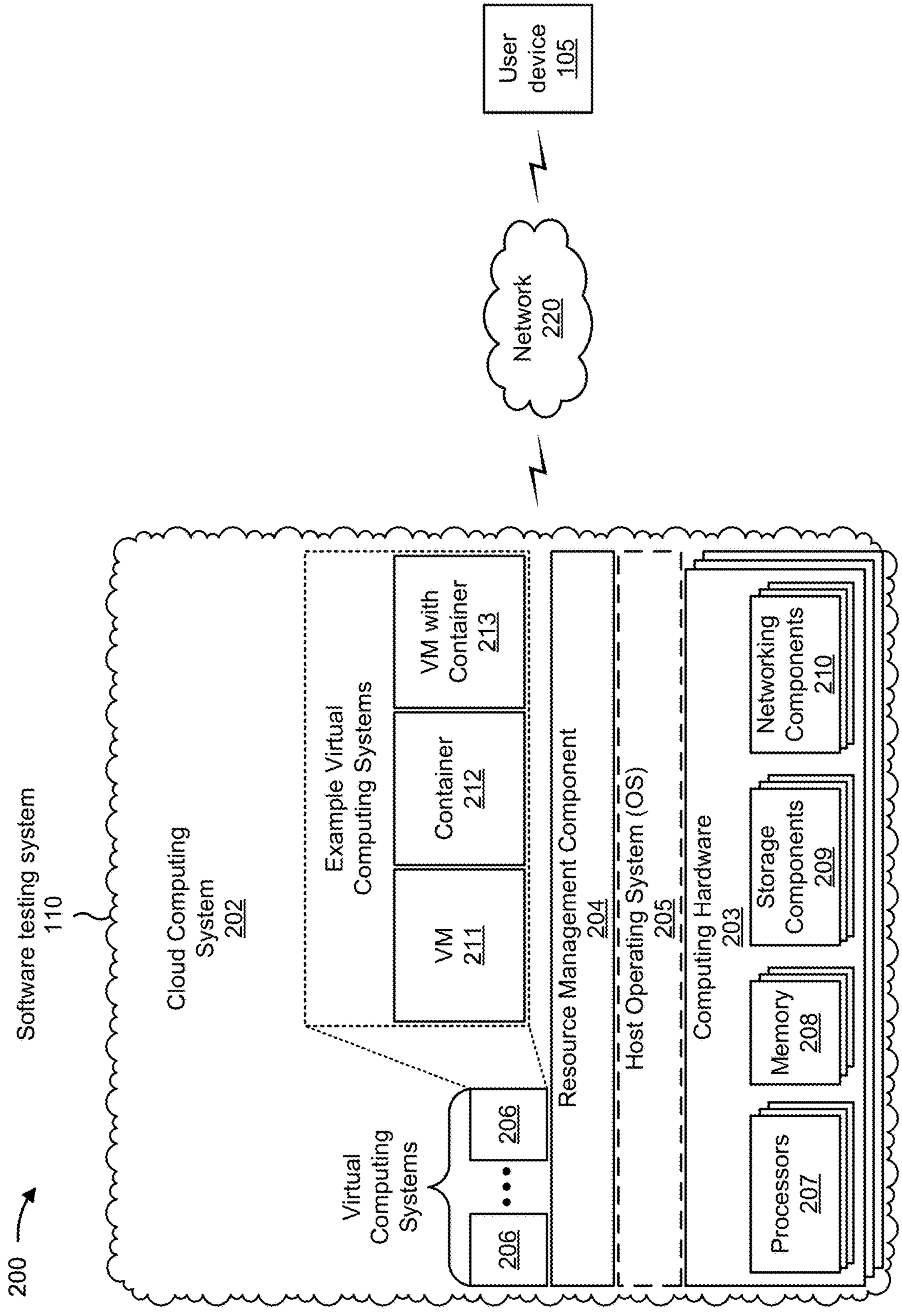
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the software testing system 110, which may include one or more elements of and/or may execute within a cloud computing system 202. The cloud computing system 202 may include one or more elements 203-213, as described in more detail below. As further shown in FIG. 2, the environment 200 may include the user device 105 and/or a network 220. Devices and/or elements of the environment 200 may interconnect via wired connections and/or wireless connections.

The user device 105 may include one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the software testing system 110 may include one or more elements 203-213 of the cloud computing system 202, may execute within the cloud computing system 202, and/or may be hosted within the cloud computing system 202, in some implementations, the software testing system 110 may not be cloud-based (e.g., may be implemented outside of a cloud computing system) or may be partially cloud-based. For example, the software testing system 110 may include one or more devices that are not part of the cloud computing system 202, such as the device 300 of FIG. 3, which may include a standalone server or another type of computing device. The software testing system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
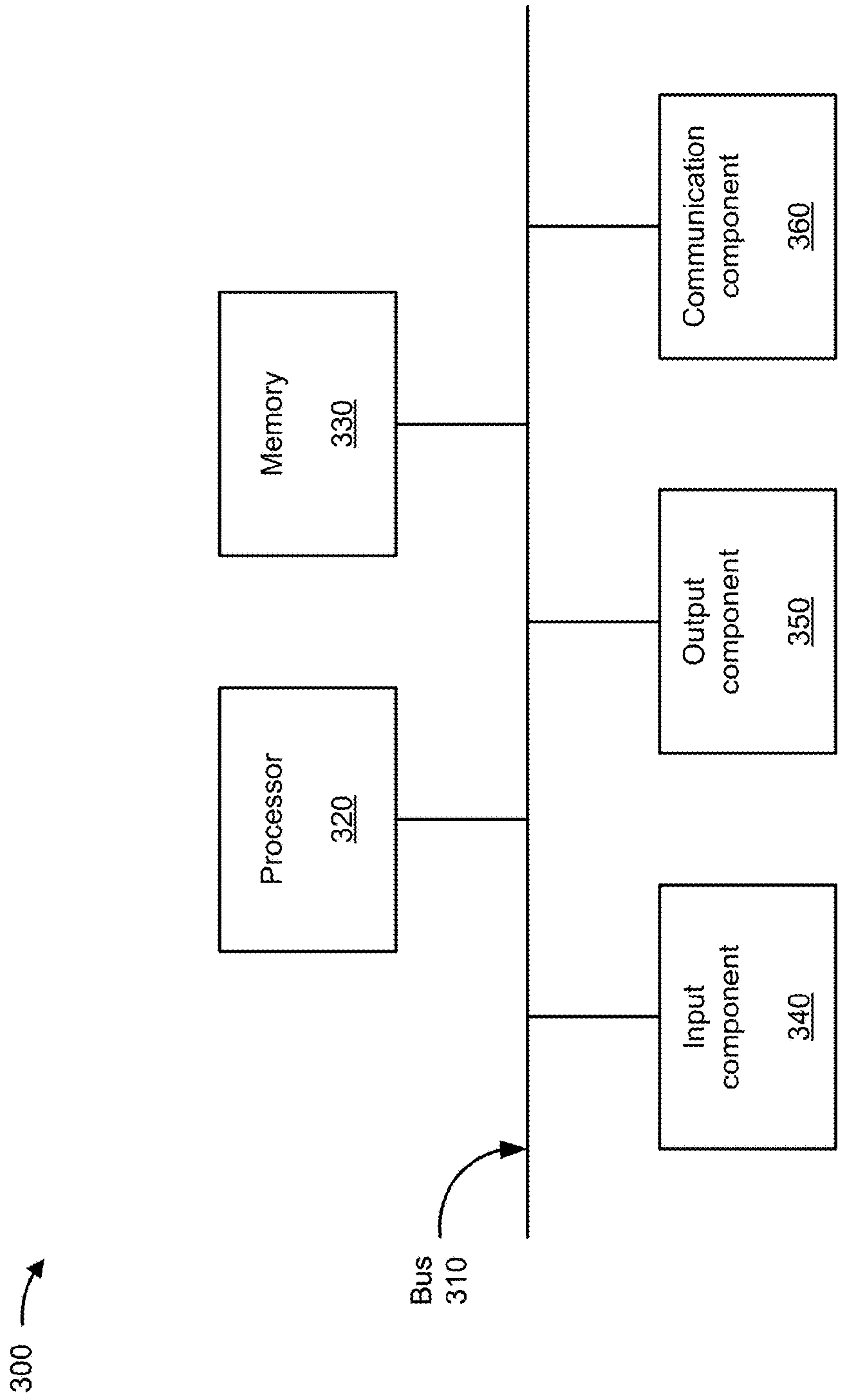
FIG. 3 is a diagram of example components of one or more devices of FIG. 2.

FIG. 3 is a diagram of example components of a device 300, which may correspond to the user device 105 and/or the software testing system 110. In some implementations, the user device 105 and/or the software testing system 110 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
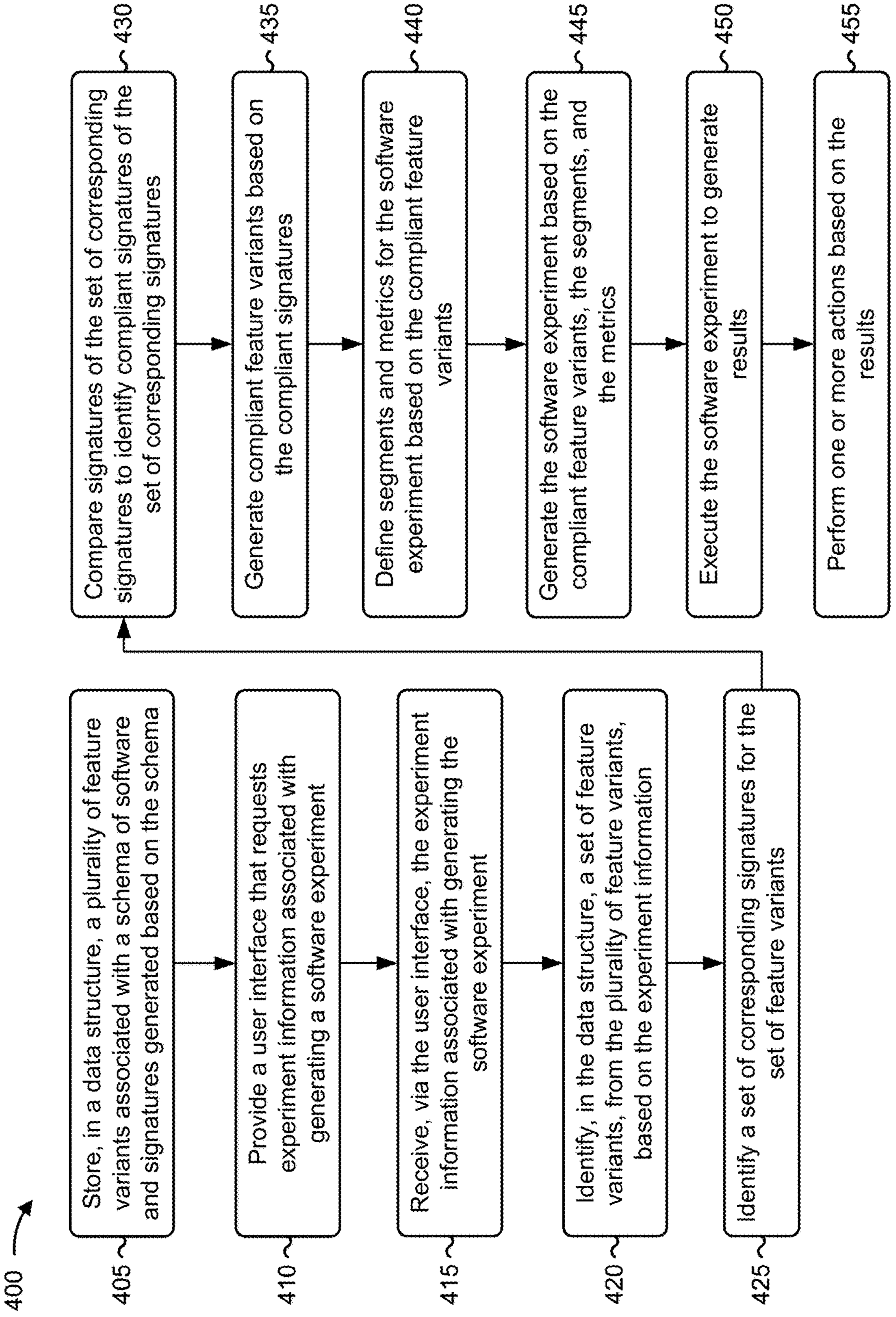
FIG. 4 is a flowchart of an example process for discovery and generalized experimentation with different types of software components.

FIG. 4 is a flowchart of an example process 400 for discovery and generalized experimentation with different types of software components. In some implementations, one or more process blocks of FIG. 4 may be performed by a device (e.g., the software testing system 110). In some implementations, one or more process blocks of FIG. 4 may be performed by another device or a group of devices separate from or including the device, such as a user device (e.g., the user device 105), and/or the like. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include storing, in a data structure, a plurality of feature variants associated with a schema of software and signatures generated based on the schema (block 405). For example, the device may store, in a data structure, a plurality of feature variants associated with a schema of software and signatures generated based on the schema, as described above. In some implementations, the plurality of feature variants includes one or more software components, one or more software models, one or more application programming interfaces, and/or one or more user interface elements. In some implementations, storing, in the data structure, the plurality of feature variants and the signatures includes storing, in the data structure, one or more of the schema, resource identifiers, descriptions, or parameters associated with the software. In some implementations, each of the signatures includes information identifying one or more of a type associated with one of the plurality of feature variants, a model associated with one of the plurality of feature variants, functionality associated with one of the plurality of feature variants, inputs associated with one of the plurality of feature variants, outputs associated with one of the plurality of feature variants, or measurement criteria associated with one of the plurality of feature variants.

As further shown in FIG. 4, process 400 may include providing a user interface that requests experiment information associated with generating a software experiment (block 410). For example, the device may provide a user interface that requests experiment information associated with generating a software experiment, as described above.

As further shown in FIG. 4, process 400 may include receiving, via the user interface, the experiment information associated with generating the software experiment (block 415). For example, the device may receive, via the user interface, the experiment information associated with generating the software experiment, as described above.

As further shown in FIG. 4, process 400 may include identifying, in the data structure, a set of feature variants, from the plurality of feature variants, based on the experiment information (block 420). For example, the device may identify, in the data structure, a set of feature variants, from the plurality of feature variants, based on the experiment information, as described above.

As further shown in FIG. 4, process 400 may include identifying a set of corresponding signatures for the set of feature variants (block 425). For example, the device may identify a set of corresponding signatures for the set of feature variants, as described above.

As further shown in FIG. 4, process 400 may include comparing signatures of the set of corresponding signatures to identify compliant signatures of the set of corresponding signatures (block 430). For example, the device may compare signatures of the set of corresponding signatures to identify compliant signatures of the set of corresponding signatures, as described above. In some implementations, comparing the signatures of the set of corresponding signatures to identify the compliant signatures of the set of corresponding signatures includes one or more of comparing functionalities of the signatures to identify the compliant signatures of the set of corresponding signatures, or comparing combinations of functionalities of the signatures to identify the compliant signatures of the set of corresponding signatures.

As further shown in FIG. 4, process 400 may include generating compliant feature variants based on the compliant signatures (block 435). For example, the device may generate compliant feature variants based on the compliant signatures, as described above.

As further shown in FIG. 4, process 400 may include defining segments and metrics for the software experiment based on the compliant feature variants (block 440). For example, the device may define segments and metrics for the software experiment based on the compliant feature variants, as described above. In some implementations, each of the segments includes a set of users, user devices, or user accounts. In some implementations, the metrics include business metrics or technical metrics.

As further shown in FIG. 4, process 400 may include generating the software experiment based on the compliant feature variants, the segments, and the metrics (block 445). For example, the device may generate the software experiment based on the compliant feature variants, the segments, and the metrics, as described above.

As further shown in FIG. 4, process 400 may include executing the software experiment to generate results (block 450). For example, the device may execute the software experiment to generate results, as described above.

As further shown in FIG. 4, process 400 may include performing one or more actions based on the results (block 455). For example, the device may perform one or more actions based on the results, as described above. In some implementations, performing the one or more actions includes one or more of providing the results for display; providing, for display, documentation, code, and sample data associated with the software experiment; or generating software code based on the software experiment and implementing the software code. In some implementations, performing the one or more actions includes modifying the software experiment based on the results and to generate a modified software experiment, and executing the modified software experiment to generate additional results. In some implementations, performing the one or more actions includes modifying one or more of the compliant feature variants based on the results and to generate a modified software experiment, and executing the modified software experiment.

In some implementations, process 400 includes receiving the software that includes the plurality of feature variants associated with the schema. In some implementations, process 400 includes enabling inspection of one or more of the compliant feature variants prior to executing the software experiment. In some implementations, process 400 includes enabling execution of one or more of the compliant feature variants prior to executing the software experiment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

storing, by a device and in a data structure, a plurality of feature variants associated with a schema of software and signatures generated based on the schema;

providing, by the device, a user interface that requests experiment information associated with generating a software experiment;

receiving, by the device and via the user interface, the experiment information associated with generating the software experiment;

identifying, by the device and in the data structure, a set of feature variants, from the plurality of feature variants, based on the experiment information;

identifying, by the device, a set of corresponding signatures for the set of feature variants;

comparing, by the device, signatures of the set of corresponding signatures to identify compliant signatures of the set of corresponding signatures;

determining a set of compliant feature variants from the set of feature variants, wherein each compliant feature variant of the set of compliant feature variants corresponds to a respective compliant signature;

generating a subset of compliant feature variants from the set of compliant feature variants, the subset of compliant feature variants having a same functionality and a same signature;

defining, by the device, segments and metrics for the software experiment based on the compliant feature variants;

generating, by the device, the software experiment based on the compliant feature variants, the segments, and the metrics;

executing, by the device, the software experiment to generate results; and performing, by the device, one or more actions based on the results.

2. The method of claim 1, further comprising:

receiving the software that includes the plurality of feature variants associated with the schema.

3. The method of claim 1, wherein the plurality of feature variants includes one or more of:

one or more software components, one or more software models, one or more application programming interfaces, or one or more user interface elements.

4. The method of claim 1, wherein storing, in the data structure, the plurality of feature variants and the signatures comprises:

storing, in the data structure, one or more of the schema, resource identifiers, descriptions, or parameters associated with the software.

5. The method of claim 1, wherein each of the signatures includes information identifying one or more of:

a type associated with one of the plurality of feature variants,
a model associated with one of the plurality of feature variants,
functionality associated with one of the plurality of feature variants,
inputs associated with one of the plurality of feature variants,
outputs associated with one of the plurality of feature variants, or
measurement criteria associated with one of the plurality of feature variants.

6. The method of claim 1,
wherein comparing the signatures of the set of corresponding signatures to identify the compliant signatures of the set of corresponding signatures comprises one or more of:
comparing functionalities of the signatures to identify the compliant signatures of the set of corresponding signatures, or
comparing combinations of functionalities of the signatures to identify the compliant signatures of the set of corresponding signatures.

7. The method of claim 1,
wherein each of the segments includes a set of users, user devices, or user accounts.

8. A device, comprising:
one or more memories; and
one or more processors, coupled to the one or more memories, configured to:
receive software that includes a plurality of feature variants associated with a schema;
store, in a data structure, the plurality of feature variants and signatures generated based on the schema;
provide a user interface that requests experiment information associated with generating a software experiment;
receive, via the user interface, the experiment information associated with generating the software experiment;
identify, in the data structure, a set of feature variants, from the plurality of feature variants, based on the experiment information;
identify a set of corresponding signatures for the set of feature variants;
compare signatures of the set of corresponding signatures to identify compliant signatures of the set of corresponding signatures;
determine a set of compliant feature variants from the set of feature variants, wherein each compliant feature variant of the set of compliant feature variants corresponds to a respective compliant signature;
generate a subset of compliant feature variants from the set of compliant feature variants, the subset of compliant feature variants having a same functionality and a same signature;
define segments and metrics for the software experiment based on the compliant feature variants;
generate the software experiment based on the compliant feature variants, the segments, and the metrics;
execute the software experiment to generate results; and
perform one or more actions based on the results.

9. The device of claim 8,
wherein the metrics include business metrics or technical metrics.

10. The device of claim 8,
wherein the one or more processors are further configured to:
enable inspection of one or more of the compliant feature variants prior to executing the software experiment.

11. The device of claim 8,
wherein the one or more processors are further configured to:
enable execution of one or more of the compliant feature variants prior to executing the software experiment.

12. The device of claim 8,
wherein the one or more processors, to perform the one or more actions, are configured to one or more of:
provide the results for display,
provide, for display, documentation, code, and sample data associated with the software experiment, or
generate software code based on the software experiment and implement the software code.

13. The device of claim 8,
wherein the one or more processors, to perform the one or more actions, are configured to:
modify the software experiment based on the results and to generate a modified software experiment; and
execute the modified software experiment to generate additional results.

14. The device of claim 8,
wherein the one or more processors, to perform the one or more actions, are configured to:
modify one or more of the compliant feature variants based on the results and to generate a modified software experiment; and
execute the modified software experiment.

15. A non-transitory computer-readable medium storing a set of instructions, the set of instructions comprising:
one or more instructions that, when executed by one or more processors of a device, cause the device to:
store, in a data structure, a plurality of feature variants associated with a schema of software and signatures generated based on the schema,
wherein the plurality of feature variants includes one or more of:
one or more software components,
one or more software models,
one or more application programming interfaces, or
one or more user interface elements;
provide a user interface that requests experiment information associated with generating a software experiment;
receive, via the user interface, the experiment information associated with generating the software experiment;
identify, in the data structure, a set of feature variants, from the plurality of feature variants, based on the experiment information;
identify a set of corresponding signatures for the set of feature variants;
compare signatures of the set of corresponding signatures to identify compliant signatures of the set of corresponding signatures;
determine a set of compliant feature variants from the set of feature variants, wherein each compliant feature variant of the set of compliant feature variants corresponds to a respective compliant signature;

generate a subset of compliant feature variants from the set of compliant feature variants, the subset of compliant feature variants having a same functionality and a same signature;

define segments and metrics for the software experiment based on the compliant feature variants;

generate the software experiment based on the compliant feature variants, the segments, and the metrics;

execute the software experiment to generate results; and perform one or more actions based on the results.

16. The non-transitory computer-readable medium of claim 15, wherein the one or more instructions, that cause the device to store, in the data structure, the plurality of feature variants and the signatures, cause the device to:

store, in the data structure, one or more of the schema, resource identifiers, descriptions, or parameters associated with the software.

17. The non-transitory computer-readable medium of claim 15, wherein the one or more instructions, that cause the device to compare the signatures of the set of corresponding signatures to identify the compliant signatures of the set of corresponding signatures, cause the device to:

compare functionalities of the signatures to identify the compliant signatures of the set of corresponding signatures, or compare combinations of functionalities of the signatures to identify the compliant signatures of the set of corresponding signatures.

18. The non-transitory computer-readable medium of claim 15, wherein the one or more instructions further cause the device to one or more of:

enable inspection of one or more of the compliant feature variants prior to executing the software experiment, or enable execution of one or more of the compliant feature variants prior to executing the software experiment.

19. The non-transitory computer-readable medium of claim 15, wherein the one or more instructions, that cause the device to perform the one or more actions, cause the device to one or more of:

provide the results for display, provide, for display, documentation, code, and sample data associated with the software experiment, or generate software code based on the software experiment and implement the software code.

20. The non-transitory computer-readable medium of claim 15, wherein the one or more instructions, that cause the device to perform the one or more actions, cause the device to:

modify the software experiment based on the results and to generate a modified software experiment; and execute the modified software experiment to generate additional results.

* * * * *